Nov. 22, 1960  J. C. PIRTLE  2,961,150
FRAME STRUCTURE FOR TURBO-MACHINE
Filed Dec. 30, 1958  2 Sheets-Sheet 1
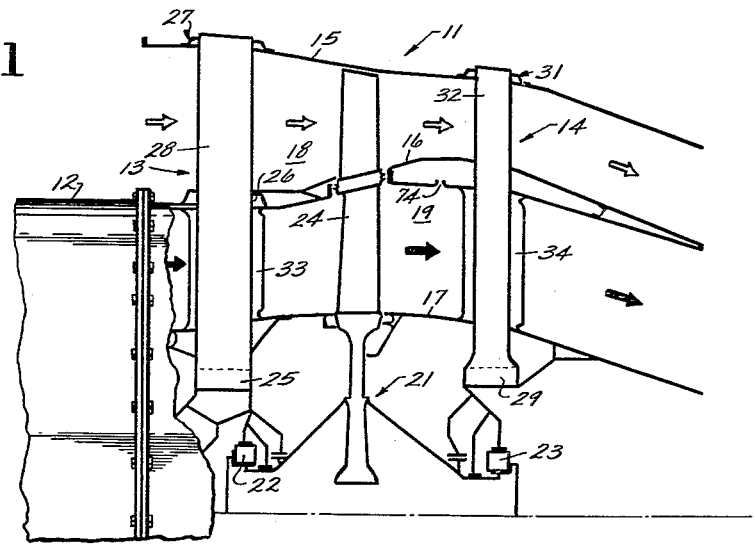
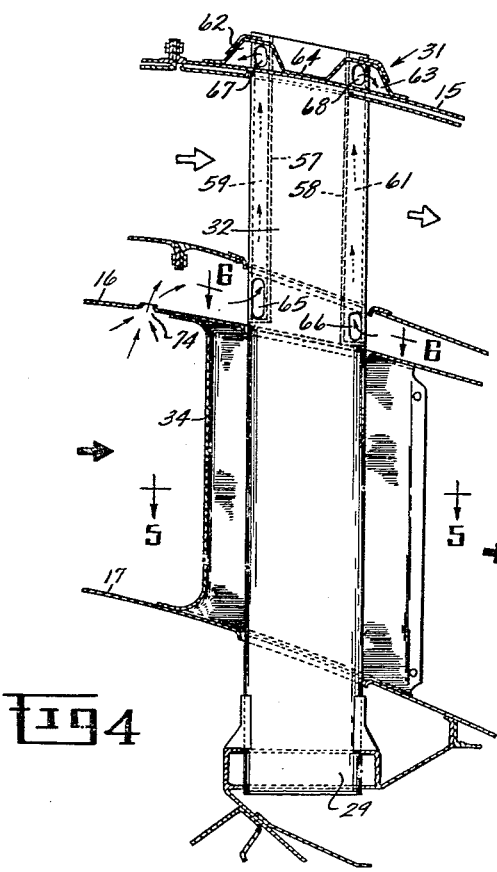
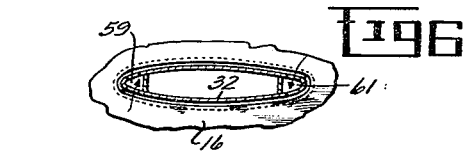
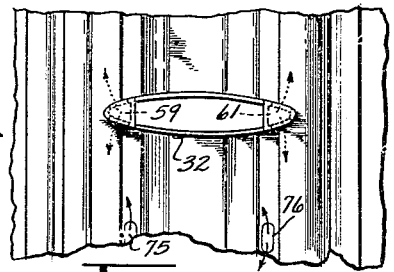
INVENTOR.
JOHN C. PIRTLE
BY Robert B. Crouch
ATTORNEY- Nov. 22, 1960  J. C. PIRTLE  2,961,150
FRAME STRUCTURE FOR TURBO-MACHINE
Filed Dec. 30, 1958  2 Sheets-Sheet 2
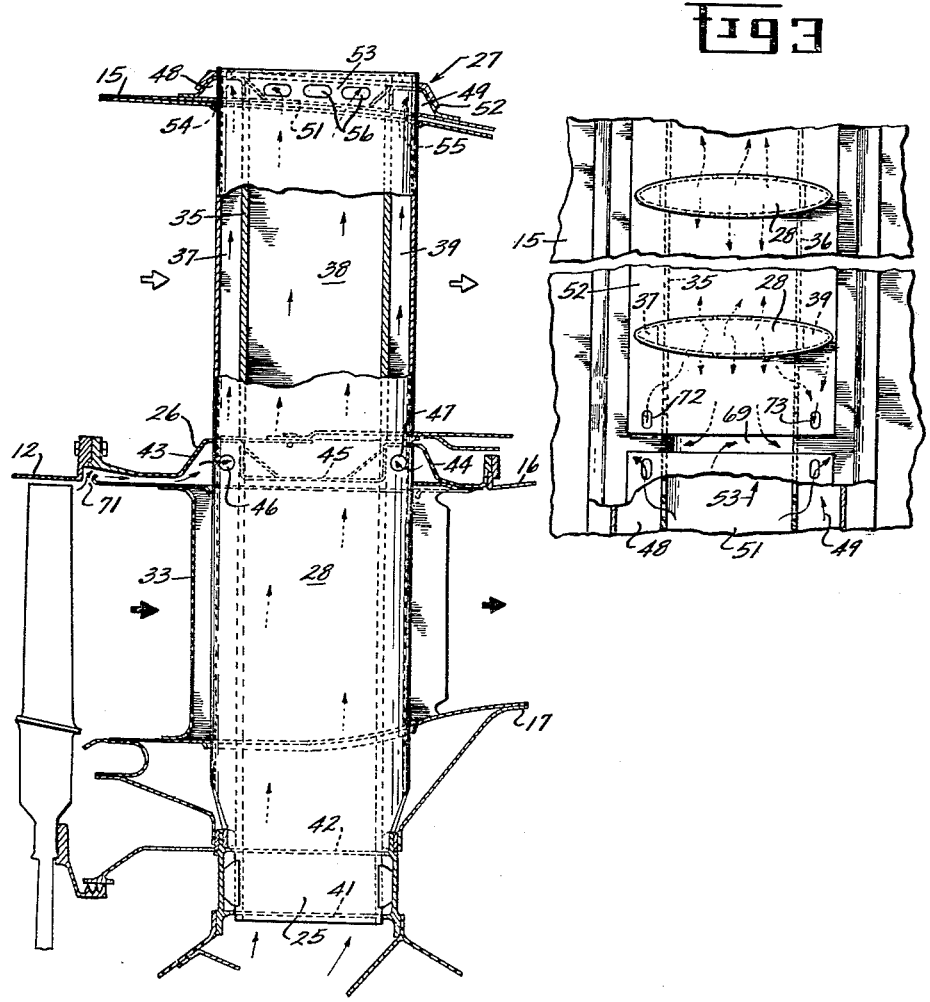
INVENTOR.
JOHN C. PIRTLE
BY Robert B. Crouch
ATTORNEY United States Patent Office 2,961,150
Patented Nov. 22, 1960

2,961,150

FRAME STRUCTURE FOR TURBO-MACHINE

John C. Pirtle, Cincinnati, Ohio, assignor to General Electric Company, a corporation of New York Filed Dec. 30, 1958, Ser. No. 783,912

3 Claims. (Cl. 230—116)

The present invention relates to a frame structure for a turbomachine having concentric compressor and turbine passages and more particularly to a frame structure incorporating means for reducing the thermal interference occasioned by the temperature differential existing between the two passages.

In a turbomachine of the type having a compressor passage concentric with a turbine passage, such as a jet engine or a post turbine fan thrust augmentor, the large temperature differential existing between the gases flowing through the two passages creates thermal interference in the structure of the machine. Since the structure of the turbine passage is subjected to much higher temperatures than that of the compressor passage, the structure within and adjacent the turbine passage tends to expand or grow to a much greater degree than the structure in the compressor passage. This differential expansion induces stresses in the entire structure which cause warping, distortion and ultimate failure of various parts of the structure.

An object of the present invention is to provide a turbomachine frame structure for reducing the stresses induced by differential expansion resulting from concentric compressor and turbine passages.

The present invention comprehends a frame structure for a turbomachine having concentric compressor and turbine passages, the frame structure incorporating means for achieving substantially uniform expansion of the entire structure. This result is realized by provision of a frame which includes a number of hollow radial struts joined by a plurality of hollow concentric rings. Hot gases from the turbine or turbine passage are circulated through the struts and the rings to substantially equalize the temperature throughout the entire structure and minimize the stresses induced by differential expansion.

Other objects and many of the attendant advantages of this invention will be readily appreciated as the same becomes better understood by reference to the following detailed description when considered in connection with the accompanying drawings wherein:

Fig. 1 is an elevation view partly in section showing the present invention embodied in a post turbine fan thrust augmentor attached to the tailpipe of a gas generator;

Fig. 2 is an elevation view partly in section of the forward frame members of the augmentor of Fig. 1;

Fig. 3 is a top plan view of the forward frame of Fig. 2;

Fig. 4 is an elevation view partly in section of the rear frame members of the augmentor of Fig. 1;

Fig. 5 is a sectional view taken along lines 5—5 of Fig. 4;

Fig. 6 is a sectional view taken along lines 6—6 of Fig. 4; and

Fig. 7 is a top plan view of the rear frame of Fig. 4.

The present invention is illustrated in Fig. 1 as applied to a post turbine fan thrust augmentor, identified generally at 11, which is mounted on the tailpipe 12 of a gas generator, such as a turbo-jet engine. The thrust augmentor 11 includes front and rear frames 13 and 14, respectively, supporting an outer casing 15, an intermediate casing 16, and an inner casing 17. An annular compressor passage 18 is formed between the outer casing 15 and the intermediate casing 16, and a turbine passage 19 is formed between the intermediate casing and the inner casing 17. A single stage rotor assembly 21 is supported in two bearings 22 and 23 which are carried by the front and rear frame structures respectively. The rotor assembly 21 includes a plurality of airfoil elements 24 which are made up of a turbine bucket and a compressor blade joined together in end to end relation. The front frame 13 includes an inner ring 25 which is secured to the inner casing, an intermediate ring 26 secured to the intermediate casing, and an outer ring 27 secured to the exterior of the outer casing. The three rings are joined by a plurality of radially extending struts 28. The rear frame 14 includes an inner ring 29 which is secured to the inner casing and an outer ring 31 secured to the outer casing. Rings 29 and 31 are joined by a plurality of radial struts 32. The outer rings 27 and 31 are exposed to the atmosphere; the intermediate ring 26 is exposed to the gases in the compressor passage; and the inner rings 25 and 29 are exposed to turbine discharge gases which flow inwardly around the rotor assembly and circulate within the interior of the inner casing 17. Fairings 33 and 34 surround the forward and rear struts 28 and 32 respectively within the turbine passage 19.

Referring to Fig. 2, the construction of the front frame is shown in detail. Partitions 35 and 36 adjacent the leading and trailing edges of each strut 28 divide the interior of the strut into channels 37, 38, and 39 and provide internal braces to help rigidify the strut. The inner ring 25 is a hollow box-like structure having spaced inner and outer walls 41 and 42. The radially inner ends of the struts 28 are secured within aligned openings in walls 41 and 42 with the open ends of the struts protruding through wall 41. The intermediate ring 26 consists of two hollow hat-sections 43 and 44 spaced axially apart and joined by a planar cylindrical section 45 at their radially inner edges. The struts are secured within openings in the intermediate ring and the channels 37 and 39 communicate with hat-sections 43 and 44 respectively by means of openings 46 and 47. The outer ring 27 is similar to the intermediate ring since it includes two hollow hat-sections 48 and 49 joined by a planar cylindrical center section 51. The struts 28 extend through and are secured to the outer ring. A layer of insulating material 52 covers the outer ring on either side of each strut, forming a channel 53 between itself, the hat-sections and member 51. Channels 37 and 39 communicate with hat-sections 48 and 49 through openings 54 and 55, and channel 38 communicates with channel 53 through openings 56. A fairing 33 surrounds each strut within the turbine passage and is secured to the inner casing 17 and the radially inner wall of the intermediate casing 60.

As shown in Fig. 4, the rear inner ring 29 is a hollow box-like structure similar to forward ring 25. Partitions 57 and 58 within each strut 32 extend from the intermediate casing through the outer ring 31 and divide the interior of the strut into channels 59 and 61 at the leading and trailing edges. The outer ring includes two hollow hat-sections 62 and 63 joined at their radially inner edges by a planar cylindrical section 64. The channels 59 and 61 communicate with the interior of intermediate casing 16 through openings 65 and 66, and with hat-sections 62 and 63 through openings 67 and 68. A fairing 34 surrounds each of the struts 32 within the turbine passage and is supported between the inner casing 17 and the radially inner wall of the intermediate casing 16.

During engine operation the inner ring 25 and the inner portion of the strut 28 both grow materially in a radial direction under the influence of the high temperature turbine discharge gases. The outer portion of the strut and the intermediate ring grow slightly under the influence of the much cooler gases in the compressor passage, while the outer ring 27 does not grow at all. In order to absorb the inner ring and strut expansion in the intermediate and outer rings, the latter two rings are heated and the inner portion of the strut is shielded from the turbine exhaust gases. Turbine cooling air, which is used to cool the turbine wheels of the gas generator, flows into the open inner ends of the struts 28 and radially outward through channel 38. The turbine cooling air is discharged from the struts through openings 56 into channels 53 and flows circumferentially around the casing under insulation 52. As shown in Fig. 3, a space 69 is left between the edges of adjacent pieces of insulating material to provide an outlet for the turbine cooling gases. Turbine discharge gases are picked up through openings 71 and flow into the interior of the intermediate casing 16. These gases then enter hat-sections 43 and 44 and flow circumferentially thereof. Portions of the gases enter openings 46 and 47 and flow radially outward through channels 37 and 39 to anti-ice the leading and trailing edges of the outer portion of the strut 28. These gases are then discharged into the hat-sections 48 and 49 of the outer ring through openings 54 and 55. After flowing circumferentially of the outer casing and heating the casing and outer ring, these gases are discharged through openings 72 and 73 in the hat-sections to the atmosphere. The fairing 33 surrounding the inner portion of each strut shields the strut from direct contact with the turbine discharge gases and minimizes expansion thereof.

The front frame carries radial and axial loads from bearing 22 and axial loads at the inner and outer rings from the exhaust nozzles. These loads are all introduced into the gas generator 12 at the intermediate ring structure 26.

The rear frame structure carries only radial loads from bearing 23 and serves to maintain the inner and outer casings concentric. In the rear frame, turbine discharge gases enter opening 74 and circulate within the intermediate casing 16. The gases enter channels 59 and 61 through openings 65 and 66 and are discharged through openings 67 and 68 into the interior of hat-sections 62 and 63. These gases anti-ice the leading and trailing edges of the outer portion of the strut 32 and flow circumferentially of the outer casing to heat the outer ring and outer casing. Fairing 34 performs the same function with regard to strut 32 as fairing 33 does to strut 28, in that it shields the strut from contact with the turbine discharge gases and reduces the expansion thereof. Fairing 34 also supports the intermediate casing from the inner casing.

Since the concentric rings of both the front and rear frame structures are subjected to essentially the same temperatures by circulation of the heating gases, the entire frame tends to expand uniformly. Thermal interference resulting from differential expansion of the frames is thus reduced to a minimum.

The intermediate ring 26 and outer rings 27 and 31 are formed from twin hat-sections and cylindrical center sections to compensate for sheer-lag which is present in a box-like structure. Since the struts are subject to axial loads from the exhaust nozzles, they tend to cock or lean in an axial direction. This introduces a bending moment at the intermediate and outer rings, thus requiring the stiffness of the rings to be at their axial extremities to counteract the bending moment. This permits the use of the twin-hat-sections which are actually more rigid than an equivalent box-like structure. The use of only a single center section and the increased rigidity of the ring permits a reduced size with consequent weight saving.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim is:

1. In a turbomachine having concentric generally cylindrical casings defining concentric compressor and turbine passage, a frame structure for reducing stresses due to thermal differentials within the turbomachine structure, comprising: two groups of radially extending hollow struts traversing both passages, the groups of struts being spaced apart axially of the turbomachine; a pair of outer hollow rings, each ring being secured to the exterior surface of the outermost casing and to the radially outer extremity of each strut in a group of struts, each ring being in fluid flow communication with the interior of each strut; a pair of inner hollow rings positioned within the interior of the innermost casing, each ring being secured to the radially inner extremity of each strut of a group of struts; and means on the intermediate casing in fluid flow communication with the interior of the struts of each group for circulating hot gases from the turbine passage through the struts and outer rings to cause substantially uniform expansion of the entire structure.

2. In a turbomachine having concentric generally cylindrical casings defining concentric compressor and turbine passages, a frame structure for reducing stresses due to thermal differentials within the turbomachine structure, comprising: a plurality of radially extending hollow struts traversing both passages; an outer hollow ring secured to the exterior surface of the outermost casing and to the radially outer extremity of each strut, the ring being divided into a plurality of separate sections each of which is in fluid flow communication with a portion of the interior of each strut; an inner hollow ring positioned within the interior of the innermost casing and secured to the radially inner extremity of each strut; and means on the intermediate casing in fluid flow communication with the interior of each strut for directing hot gases from the turbine passage through the struts and outer ring to cause substantially uniform expansion of the entire structure.

3. In a turbomachine having concentric generally cylindrical casings defining concentric compressor and turbine passages, a frame structure for reducing stresses due to thermal differentials within the turbomachine structure comprising: a plurality of radially extending hollow struts traversing both passages; an outer hollow ring secured to the exterior surface of the outermost casing and to the radially outer extremity of each strut, the interior of the ring being in fluid flow communication with the interior of each strut; an inner hollow ring positioned within the interior of the innermost casing and secured to the radially inner extremity of each strut; and an intermediate hollow ring connected to the intermediate casing and each strut, the intermediate ring being in fluid flow communication with the interior of each strut and the turbine passage for circulating hot gases through the struts and outer ring to cause substantially uniform expansion of the entire structure.

References Cited in the file of this patent

UNITED STATES PATENTS

| | | |
|---|---|---|
| 2,505,660 | Baumann | Apr. 25, 1950 |
| 2,620,624 | Wislicenus | Dec. 9, 1952 |
| 2,692,724 | McLeod | Oct. 26, 1954 |
| 2,711,074 | Howard | June 21, 1955 |
| 2,859,934 | Halford et al. | Nov. 11, 1958 |
| 2,891,382 | Broffitt | June 23, 1959 |